(12) United States Patent
Zheng et al.

(10) Patent No.: US 12,528,378 B2
(45) Date of Patent: Jan. 20, 2026

(54) CHARGING METHOD AND CHARGING APPARATUS

(71) Applicant: Contemporary Amperex Technology (Hong Kong) Limited, Hong Kong (CN)

(72) Inventors: Zhimin Zheng, Fujian (CN); Yong Cheng, Fujian (CN); Jinmei Xu, Fujian (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 19/091,880

(22) Filed: Mar. 27, 2025

(65) Prior Publication Data

US 2025/0353398 A1 Nov. 20, 2025

Related U.S. Application Data

(63) Continuation of application No. PCT/CN2024/093486, filed on May 15, 2024.

(51) Int. Cl.
*B60L 53/62* (2019.01)
*B60L 53/53* (2019.01)
*B60L 53/66* (2019.01)

(52) U.S. Cl.
CPC ............... *B60L 53/62* (2019.02); *B60L 53/53* (2019.02); *B60L 53/66* (2019.02)

(58) Field of Classification Search
CPC ..... B60L 53/62; B60L 53/66; B60L 53/53–55
See application file for complete search history.

(56) References Cited

U.S. PATENT DOCUMENTS

2022/0328936 A1 10/2022 Zhang et al.
2022/0348105 A1* 11/2022 Sujan .................. B60L 53/62

FOREIGN PATENT DOCUMENTS

CN 105914849 A 8/2016
CN 106080243 A 11/2016
(Continued)

OTHER PUBLICATIONS

International Search Report and Written Opinion mailed on Jan. 22, 2025, received for PCT Application PCT/CN2024/093486, filed on May 15, 2024, 13 pages including English Translation.
(Continued)

*Primary Examiner* — David V Henze-Gongola
(74) *Attorney, Agent, or Firm* — XSENSUS LLP

(57) ABSTRACT

Embodiments of this application disclose a charging method and a charging apparatus, which can effectively improve the charging speed of a battery apparatus at a relatively low cost. The charging method is applied to a charging apparatus, where the charging apparatus includes an energy storage apparatus, and the charging apparatus is configured to charge a battery apparatus through the energy storage apparatus, the method including: determining charging demand information of the battery apparatus, where the charging demand information is used to indicate charging demand power of the battery apparatus; determining discharge capacity information of the energy storage apparatus; determining a charging parameter of the charging apparatus according to the discharge capacity information and the charging demand information; and charging the battery apparatus according to the charging parameter, where charging power corresponding to the charging parameter is less than or equal to the charging demand power.

18 Claims, 6 Drawing Sheets

(56) References Cited

FOREIGN PATENT DOCUMENTS

| | | |
|---|---|---|
| CN | 113682159 A | 11/2021 |
| CN | 117092543 A | 11/2023 |
| CN | 220535428 U | 2/2024 |
| CN | 117728466 A | 3/2024 |
| CN | 117996754 A | 5/2024 |
| EP | 3708416 A1 | 9/2020 |
| WO | 2014/068733 A1 | 5/2014 |
| WO | 2023/022102 A1 | 2/2023 |
| WO | 2023/077861 A1 | 5/2023 |

OTHER PUBLICATIONS

First Office Action mailed on Oct. 29, 2024, received for CN Application No. 202411309371.8, 21 pages including English Translation.
Extended European Search Report issued Dec. 5, 2025 in European Patent Application No. 24861336.6.

\* cited by examiner

CHARGING METHOD AND CHARGING APPARATUS

CROSS-REFERENCE TO RELATED APPLICATION

This application is a bypass continuation of International Application No. PCT/CN2024/093486, filed on May 15, 2024, which is hereby incorporated by reference in its entirety.

TECHNICAL FIELD

This application relates to the charging field and more specifically, to a charging method and a charging apparatus.

BACKGROUND

With the development of the times, electric vehicles, due to their advantages such as high environment friendliness, low noise, and low use costs, have a great market prospect and can effectively promote energy conservation and emission reduction, which is conducive to the development and progress of society. The charging speed of electric vehicles affects their development and application, as well as public acceptance.

Therefore, improving the charging speed of electric vehicles is an urgent issue that needs to be addressed.

SUMMARY

Embodiments of this application provide a charging method and a charging apparatus, which can effectively improve the charging speed of a battery apparatus at a relatively low cost.

According to a first aspect, a charging method is provided, which is applied to a charging apparatus, where the charging apparatus includes an energy storage apparatus, and the charging apparatus is configured to charge a battery apparatus through the energy storage apparatus, the method including: determining charging demand information of the battery apparatus, where the charging demand information is used to indicate charging demand power of the battery apparatus; determining discharge capacity information of the energy storage apparatus; determining a charging parameter of the charging apparatus according to the discharge capacity information and the charging demand information; and charging the battery apparatus according to the charging parameter, where charging power corresponding to the charging parameter is less than or equal to the charging demand power.

In embodiments of this application, the charging apparatus determines the charging parameter for charging the battery apparatus according to the charging demand information for indicating the charging demand power of the battery apparatus and the discharge capacity information of the energy storage apparatus, and the charging power corresponding to the determined charging parameter is less than or equal to the charging demand power. In this way, on the one hand, the charging demand of the battery apparatus can be met within the discharge capacity range of the charging apparatus; on the other hand, the goal of low-power input and high-power output for charging the battery apparatus without the need to upgrade the power grid is implemented. For example, there is no need to additionally configure external transformers or expand transformer capacity for the power grid, thereby improving the charging speed of the battery apparatus at a relatively low construction cost.

In some possible embodiments, the charging power includes discharge power of the energy storage apparatus.

In the above technical solution, the charging power includes the discharge power of the energy storage apparatus, meaning that part or all of the charging power is derived from the discharge power of the energy storage apparatus. In other words, there are multiple ways for the charging apparatus to charge the battery apparatus, such as the energy storage apparatus charging the battery apparatus independently, or the energy storage apparatus and other components jointly charging the battery apparatus. In this way, the charging apparatus can flexibly use an appropriate charging method based on actual conditions to charge the battery apparatus, thereby effectively improving charging efficiency.

In some possible embodiments, a ratio of rated energy to rated power of the energy storage apparatus is less than or equal to 1:3; and/or a ratio of the rated energy to maximum discharge power of the energy storage apparatus is less than or equal to 1:4; and/or an energy density of the energy storage apparatus is greater than or equal to 380 watt-hours per liter.

In the above technical solution, the rated energy of the energy storage apparatus is relatively small and the energy density of the energy storage apparatus is greater than or equal to 380 watt-hours per liter, meaning that the capacity and volume of the energy storage apparatus are both small. This saves space occupied by the energy storage apparatus and reduces a size of the charging apparatus. On the other hand, the maximum discharge power of the energy storage apparatus is relatively large, enabling the charging apparatus to provide supercharging capability without upgrading the power grid, thereby effectively reducing the construction cost of the charging apparatus.

In some possible embodiments, the charging demand information includes charging mode information, where in a case that the charging mode information includes first charging mode information, the charging demand power includes first charging demand power; and in a case that the charging mode information includes second charging mode information, the charging demand power includes second charging demand power; where the first charging demand power is greater than the second charging demand power.

The above technical solution provides two charging modes, and the two charging modes correspond to different charging demand powers. In this way, in an actual charging process, the charging apparatus can flexibly use an appropriate charging method based on actual conditions to charge the battery apparatus, thereby effectively improving charging efficiency.

In some possible embodiments, in a case that the charging mode information includes the first charging mode information, the discharge power of the energy storage apparatus includes first discharge power; and in a case that the charging mode information includes the second charging mode information, the discharge power of the energy storage apparatus includes second discharge power; where the first discharge power is greater than or equal to the second discharge power.

The above technical solution provides two charging modes, and the two charging modes correspond to different discharge powers. In this way, in an actual charging process, the charging apparatus can flexibly use an appropriate charging method based on actual conditions to charge the battery apparatus, thereby effectively improving charging efficiency.

In some possible embodiments, in a case that the charging mode information includes the first charging mode information, a discharge rate of the energy storage apparatus includes a first discharge rate; and in a case that the charging mode information includes the second charging mode information, the discharge rate of the energy storage apparatus includes a second discharge rate; where the first discharge rate is greater than the second discharge rate.

The above technical solution provides two charging modes, and the two charging modes correspond to different discharge rates. In this way, in an actual charging process, the charging apparatus can flexibly use an appropriate charging method based on actual conditions to charge the battery apparatus, thereby effectively improving charging efficiency.

In some possible embodiments, in a case that the charging mode information includes the first charging mode information, the charging power includes first charging power; and in a case that the charging mode information includes the second charging mode information, the charging power includes second charging power; where the first charging power is greater than the second charging power, and The above technical solution provides two charging modes, and the two charging modes correspond to different charging powers. In this way, in an actual charging process, the charging apparatus can flexibly use an appropriate charging method based on actual conditions to charge the battery apparatus, thereby effectively improving charging efficiency.

In some possible embodiments, the determining charging demand information of the battery apparatus includes: receiving the charging mode information input by a user, where the charging mode information is used to indicate a charging mode selected by the user for charging the battery apparatus.

In the above technical solution, the charging mode information of the battery apparatus is obtained by receiving the charging mode information input by the user. The charging mode information acquired in this way is associated with the related situation of the user at the current moment. For example, if the user does not have much time to wait for the charging apparatus to charge the battery apparatus, the user can select a charging mode with higher power, thereby effectively improving the user experience.

In some possible embodiments, the method further includes: determining whether the charging mode matches the charging apparatus, and/or whether the charging mode matches the battery apparatus; and sending switching information in a case that the charging mode does not match the charging apparatus and/or the charging mode does not match the battery apparatus, where the switching information is used to indicate switching of the charging mode; where the determining a charging parameter of the charging apparatus according to the discharge capacity information and the charging demand information includes: the charging parameter is determined according to the discharge capacity information and the switched charging mode.

In the above technical solution, upon the reception of the charging mode, it is determined whether the charging mode matches the charging apparatus and/or whether the charging mode matches the battery apparatus. If there is a mismatch, switching information indicating switching of the charging mode is sent, ensuring that the final determined charging mode better matches both the charging apparatus and the battery apparatus. This results in better charging performance for the battery apparatus and improves the user experience.

In some possible embodiments, the charging demand information includes charging amount information, and the charging amount information includes one or more of the following information: a charging duration, a charging amount, a target amount of the battery apparatus, and a charging cost; and the method further includes: stopping charging of the battery apparatus when a charging operation matches the charging amount information.

In the above technical solution, the charging demand information includes one or more of the following: the charging duration, the charging amount, the target amount of the battery apparatus, and the charging cost. This means that the charging demand information may include various parameters related to charging. As a result, the accuracy of the charging parameter determined based on the charging demand information is relatively high, leading to high efficiency in charging the battery apparatus based on the parameter.

In some possible embodiments, the charging apparatus further includes an electrical power conversion apparatus, where the electrical power conversion apparatus is configured to charge the energy storage apparatus through input electrical power, the electrical power conversion apparatus has rated power, the charging demand power is greater than the rated power, the charging power is greater than the rated power, and/or the discharge power of the energy storage apparatus is greater than the rated power.

In the above technical solution, the charging demand power is greater than the rated power of the electrical power conversion apparatus, and/or the charging power is greater than the rated power of the electrical power conversion apparatus, and/or the discharge power is greater than the rated power of the electrical power conversion apparatus. This further achieves the goal of low-power input and high-power output for charging the battery apparatus, thereby significantly improving the charging speed of the battery apparatus.

In some possible embodiments, the charging demand power is greater than three times the rated power; and/or the charging power is greater than three times the rated power; and/or the discharge power of the energy storage apparatus is greater than three times the rated power.

In the above technical solution, the charging demand power is greater than three times the rated power, and/or the charging power is greater than three times the rated power, and/or the discharge power is greater than three times the rated power. This enables the charging apparatus to achieve a significantly high power output from a relatively small power input, thereby greatly improving the charging speed of the battery apparatus.

In some possible embodiments, in a case that the discharge capacity information meets a first preset condition, the charging the battery apparatus includes: charging the battery apparatus independently through the energy storage apparatus; in a case that the discharge capacity information meets a second preset condition, the charging the battery apparatus includes: charging the battery apparatus through the energy storage apparatus and the electrical power conversion apparatus; and in a case that the discharge capacity information meets a third preset condition, the charging the battery apparatus includes: charging the battery apparatus independently through the electrical power conversion apparatus.

In the above technical solution, when the discharge capacity information meets different preset conditions, the charging apparatus charges the battery apparatus through different apparatuses. In other words, the charging apparatus can flexibly use an appropriate charging method based on actual conditions to charge the battery apparatus, thereby effectively improving charging efficiency.

In some possible embodiments, the discharge capacity information includes a state of charge of the energy storage apparatus; the discharge capacity information meeting the first preset condition includes: the state of charge belonging to a first state of charge range; and/or the discharge capacity information meeting the second preset condition includes: the state of charge belonging to a second state of charge range; and/or the discharge capacity information meeting the third preset condition includes: the state of charge belonging to a third state of charge range.

In the above technical solution, a component within the charging apparatus that charges the battery apparatus is determined based on the state of charge of the energy storage apparatus. This ensures that the determined power supply source aligns with the actual condition of the energy storage apparatus, allowing the charging apparatus to complete the charging of the battery apparatus in a reasonable and efficient manner.

In some possible embodiments, the discharge capacity information includes an energy state of the energy storage apparatus; the discharge capacity information meeting the first preset condition includes: the energy state belonging to a first energy state range; and/or the discharge capacity information meeting the second preset condition includes: the energy state belonging to a second energy state range; and/or the discharge capacity information meeting the third preset condition includes: the energy state belonging to a third energy state range.

In the above technical solution, a component within the charging apparatus that charges the battery apparatus is determined based on the energy state of the energy storage apparatus. This ensures that the determined power supply source aligns with the actual condition of the energy storage apparatus, allowing the charging apparatus to complete the charging of the battery apparatus in a reasonable and efficient manner.

In some possible embodiments, the discharge capacity information indicates the maximum discharge power of the energy storage apparatus; the discharge capacity information meeting the first preset condition includes: the maximum discharge power belonging to a first power range; and/or the discharge capacity information meeting the second preset condition includes: the maximum discharge power belonging to a second power range; and/or the discharge capacity information meeting the third preset condition includes: the maximum discharge power belonging to a third power range.

In the above technical solution, a component within the charging apparatus that charges the battery apparatus is determined based on the maximum discharge power of the energy storage apparatus. This ensures that the determined power supply source aligns with the actual condition of the energy storage apparatus, allowing the charging apparatus to complete the charging of the battery apparatus in a reasonable and efficient manner.

In some embodiments, the determining discharge capacity information of the energy storage apparatus includes: determining the discharge capacity information of the energy storage apparatus according to an electrical parameter of the energy storage apparatus, where the discharge capacity information indicates the maximum discharge power of the energy storage apparatus.

In the above technical solution, the maximum discharge power of the energy storage apparatus is determined based on the electrical parameter of the energy storage apparatus.

Subsequently, the charging parameter for charging the battery apparatus is determined based on the maximum discharge power of the energy storage apparatus. This ensures that the determined charging parameter aligns with the actual condition of the energy storage apparatus, allowing the charging apparatus to charge the battery apparatus in a reasonable and efficient manner.

In some possible embodiments, in a case that the electrical parameter meets a fourth preset condition, the maximum discharge power includes a first maximum discharge power; in a case that the electrical parameter meets a fifth preset condition, the maximum discharge power includes a second maximum discharge power; and in a case that the electrical parameter meets a sixth preset condition, the maximum discharge power includes a third maximum discharge power; where the maximum discharge power increases in the following sequence: the third maximum discharge power, the first maximum discharge power, and the second maximum discharge power.

In some possible embodiments, the electrical parameter includes the state of charge of the energy storage apparatus; the electrical parameter meeting the fourth preset condition includes: the state of charge belonging to a fourth state of charge range; and/or the electrical parameter meeting the fifth preset condition includes: the state of charge belonging to a fifth state of charge range; and/or the electrical parameter meeting the sixth preset condition includes: the state of charge belonging to a sixth state of charge range.

In the above technical solution, the maximum discharge power of the energy storage apparatus is determined based on the state of charge of the energy storage apparatus. Subsequently, the charging parameter for charging the battery apparatus is determined based on the maximum discharge power of the energy storage apparatus. This ensures that the determined charging parameter aligns with the current state of the energy storage apparatus, allowing the charging apparatus to charge the battery apparatus in a reasonable and efficient manner.

In some possible embodiments, the electrical parameter includes the energy state of the energy storage apparatus; where the electrical parameter meeting the fourth preset condition includes: the energy state belonging to a fourth energy state range; and/or the electrical parameter meeting the fifth preset condition includes: the energy state belonging to a fifth energy state range; and/or the electrical parameter meeting the sixth preset condition includes: the energy state belonging to the sixth state of charge range.

In the above technical solution, the maximum discharge power of the energy storage apparatus is determined based on the energy state of the energy storage apparatus. Subsequently, the charging parameter for charging the battery apparatus is determined based on the maximum discharge power of the energy storage apparatus. This ensures that the determined charging parameter aligns with the current state of the energy storage apparatus, allowing the charging apparatus to charge the battery apparatus in a reasonable and efficient manner.

In some possible embodiments, the charging power is greater than or equal to 100 KW, and/or the charging demand power is greater than or equal to 300 KW.

In the above technical solution, the charging power is greater than or equal to 100 KW, and/or the charging demand power is greater than or equal to 300 KW. This further achieves the goal of low-power input and high-power output for charging the battery apparatus, thereby significantly improving the charging speed of the battery apparatus.

According to a second aspect, a charging apparatus is provided, including an energy storage apparatus and a control apparatus, where the charging apparatus is configured to charge a battery apparatus through the energy storage apparatus, and the control apparatus is configured to: determining charging demand information of the battery apparatus, where the charging demand information is used to indicate charging demand power of the battery apparatus; determining discharge capacity information of the energy storage apparatus; determining a charging parameter of the charging apparatus according to the discharge capacity information and the charging demand information; and charging the battery apparatus according to the charging parameter, where charging power corresponding to the charging parameter is less than or equal to the charging demand power.

According to a third aspect, a charging apparatus is provided, including a processor and a memory, where the memory is configured for storing a computer program, and the processor is configured for invoking the computer program to execute the method according to the first aspect or its various implementations.

According to a fourth aspect, a computer-readable storage medium is provided, configured for storing a computer program, where the computer program enables the computer to execute the method according to the first aspect or its various implementations.

DESCRIPTION OF EMBODIMENTS

Figure 1:
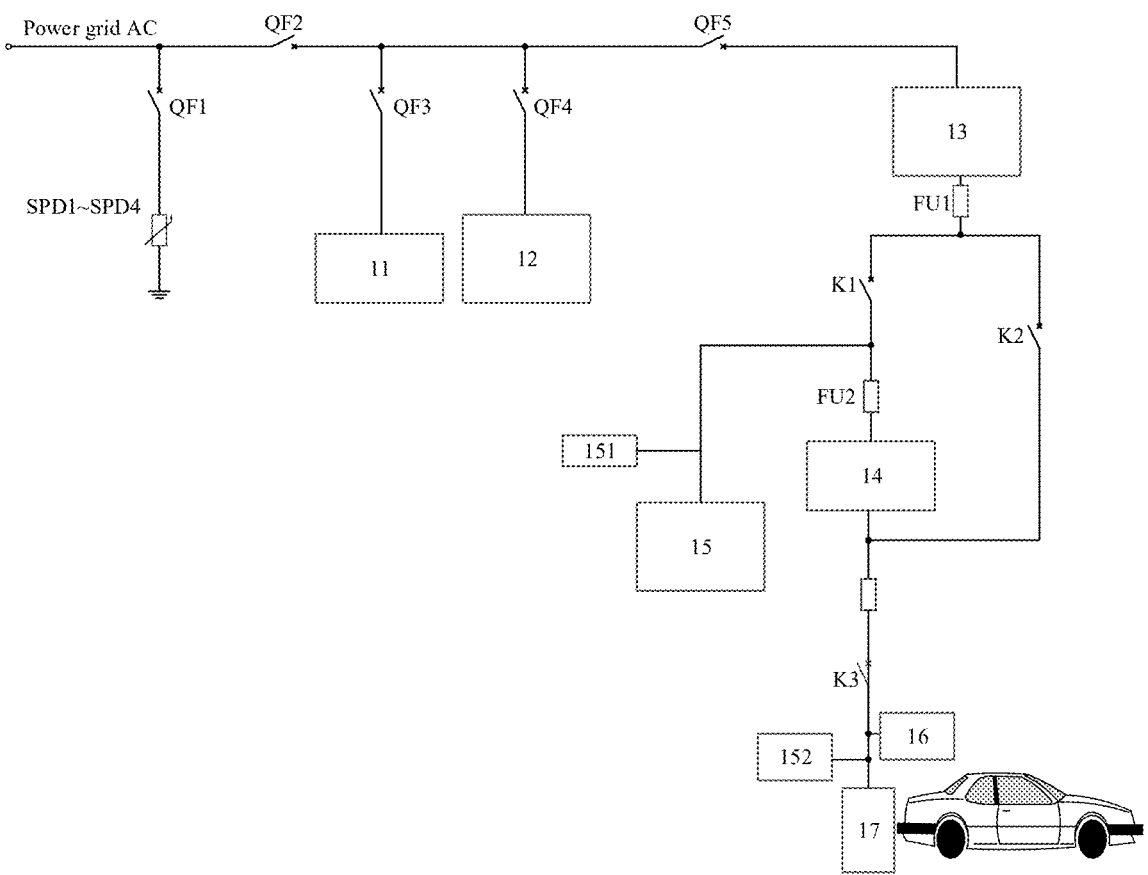
FIG. 1 is a schematic diagram of an application scenario according to an embodiment of this application.

The following further describes implementations of this application in detail with reference to the accompanying drawings and embodiments. The detailed description of the embodiments and the accompanying drawings are intended to illustrate the principle of this application, rather than to limit the scope of this application, meaning this application is not limited to the embodiments described herein.

In the description of this application, it should be noted that, unless otherwise stated, "multiple" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "have", and any variations thereof in the specification and claims of this application as well as the foregoing description of drawings are intended to cover non-exclusive inclusions.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described in this application may be combined with other embodiments.

With the development of the times, electric vehicles, due to their advantages such as high environment friendliness, low noise, and low use costs, have a great market prospect and can effectively promote energy conservation and emission reduction, which is conducive to the development and progress of society. The charging speed of electric vehicles affects their development and application, as well as public acceptance.

Generally, to increase the charging speed of electric vehicles, it is necessary to configure external transformers or expand transformer capacity for charging piles, which will increase costs, hinder the promotion of charging piles, and affect the charging experience of users, thereby greatly limiting the development and application of electric vehicles.

In view of this, embodiments of this application provide a charging method that can effectively improve the charging speed of a battery apparatus at a low cost.

FIG. 1 is a schematic diagram of an application scenario according to an embodiment of this application. The electrical system 100 shown in FIG. 1 may include lightning protection apparatuses SPD1-SPD4, switching apparatuses QF1-QF5, a thermal management system 11, a low-voltage power supply module 12, an alternating current/direct current (alternating current/direct current, AC/DC) converter 13, fuse apparatuses FU1 and FU2, switching apparatuses K1-K3, a bidirectional direct current/direct current (direct current/direct current, DC/DC) converter module 14, an energy storage apparatus 15, insulation inspection modules 151 and 152, a meter 16, and a charging module 17. The charging module, for example, may be a charging gun, and the charging gun may be configured to connect with the battery apparatus, for example connecting with a power battery apparatus in a vehicle, thereby charging the power battery apparatus through the electrical system 100 shown in FIG. 1.

The low-voltage power supply module 12 may be an electrically isolated AC/DC converter, and the low-voltage power supply module 12 is configured to supply power to components such as the energy management system (energy management system, EMS), the CCU, and the battery management system (battery management system, BMS).

The AC/DC converter 13 may be a bidirectional AC/DC converter. In this case, exemplarily, not only the power grid can supply power to the battery apparatus connected to the charging module 17 through the bidirectional AC/DC converter, but also the battery apparatus can supply power to the power grid through the bidirectional AC/DC converter.

In the application scenario shown in FIG. 1, the electrical system 100 can obtain alternating current from the power grid, convert it to direct current via the AC/DC module to charge the energy storage apparatus 15, and can also supply the converted direct current to the charging module 17 to charge the battery. The power grid, for example, is a system capable of supplying power, including utility power, and the like.

The insulation inspection module 151 is configured to inspect the insulation resistance of the energy storage apparatus 15, and the insulation monitoring module 152 is configured to monitor the insulation resistance of the charging module 17.

When the electrical system 100 is operating normally, switching apparatuses QF1-QF5 are in a closed state, and the low-voltage power supply module 12 operates normally.

It should be noted that the electrical system in FIG. 1 is an example of an application scenario of embodiments of this disclosure. The addition or reduction of a component in the electrical system shown in FIG. 1 does not constitute a limitation on embodiments of this disclosure. Those skilled in the art can increase and/or reduce an apparatus in the electrical system as needed.

Figure 2:
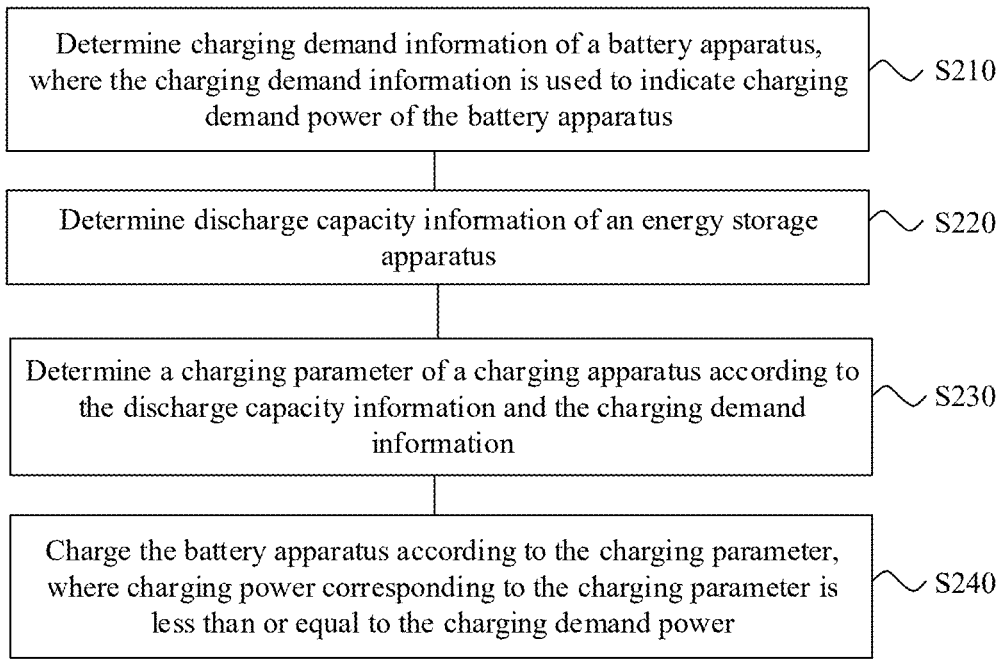
FIG. 2 is a schematic flowchart of a charging method according to an embodiment of this application.

FIG. 2 is a schematic flowchart of a charging method 200 according to an embodiment of this application. The method 200 may be applied to a charging apparatus, the charging apparatus may include an energy storage apparatus, and the charging apparatus is configured to charge a battery apparatus through the energy storage apparatus.

The method 200 may include at least part of the following content.

Step S210: Determine charging demand information of the battery apparatus, where the charging demand information is used to indicate charging demand power of the battery apparatus.

Step S220: Determine discharge capacity information of the energy storage apparatus.

Step S230: Determine a charging parameter of the charging apparatus according to the discharge capacity information and the charging demand information.

Step S240: Charge the battery apparatus according to the charging parameter, where charging power corresponding to the charging parameter is less than or equal to the charging demand power.

In embodiments of this application, the charging apparatus determines the charging parameter for charging the battery apparatus according to the charging demand information for indicating the charging demand power of the battery apparatus and the discharge capacity information of the energy storage apparatus, and the charging power corresponding to the determined charging parameter is less than or equal to the charging demand power. In this way, on the one hand, the charging demand of the battery apparatus can be met within the discharge capacity range of the charging apparatus; on the other hand, the goal of low-power input and high-power output for charging the battery apparatus without the need to upgrade the power grid is implemented. For example, there is no need to additionally configure external transformers or expand transformer capacity for the power grid, thereby improving the charging speed of the battery apparatus at a relatively low construction cost.

The battery apparatus may be an electrical device. For example, it may be an electric vehicle, ship, or spacecraft. Alternatively, the battery apparatus may be another energy storage apparatus different from the aforementioned energy storage apparatus, where the state of charge (state of charge, SOC) of the another energy storage apparatus is relatively low.

In some embodiments, a ratio of rated energy to rated power of the energy storage apparatus may be less than or equal to 1:3, and/or a ratio of the rated energy to maximum discharge power of the energy storage apparatus may be less than or equal to 1:4, and/or an energy density of the energy storage apparatus may be greater than or equal to 380 watt-hours per liter.

For example, the ratio of rated energy to rated power of the energy storage apparatus may be less than or equal to 1:4, 1:5, 1:6, 1:7, 1:8, or the like.

For example, the ratio of rated energy to maximum discharge power of the energy storage apparatus may be less than or equal to 1:5, 1:6, 1:7, 1:8, 1:9, 1:10, or the like.

For example, the energy density of the energy storage apparatus may be greater than or equal to 400 watt-hours per liter, 450 watt-hours per liter, 500 watt-hours per liter, 550 watt-hours per liter, 600 watt-hours per liter, 700 watt-hours per liter, or the like.

Optionally, a ratio of the rated energy of the energy storage apparatus to a maximum charging power of the charging apparatus may be less than or equal to 1:4. For example, it may be less than or equal to 1:5, 1:6, 1:7, 1:8, 1:9, 1:10, or the like.

It should be noted that in embodiments of this application, the unit of energy is watt-hour, and the unit of power is watt. In addition, a ratio in embodiments of this application refers to a numerical ratio.

In some embodiments, the energy storage apparatus includes one or more energy storage modules. In a case that the energy storage apparatus includes multiple energy storage modules, the multiple energy storage modules may be connected in series, in parallel, or in series-parallel. The energy storage module, for example, is an electric box.

In some embodiments, the energy storage module includes one or more battery units. In a case that the energy storage module includes multiple battery units, the multiple battery units may be connected in series, in parallel, or in series-parallel. The battery unit, for example, may be a battery cell.

Optionally, the ratio of the rated energy to the rated power of the energy storage module may also be less than or equal to 1:3, and/or the ratio of the rated energy to the maximum discharge power of the energy storage module may also be less than or equal to 1:4, and/or the energy density of the energy storage module may be greater than or equal to 380 watt-hours per liter.

Similarly, the ratio of the rated energy to the rated power of the battery unit may also be less than or equal to 1:3, and/or the ratio of the rated energy to the maximum discharge power of the battery unit may also be less than or equal to 1:4, and/or the energy density of the battery unit may be greater than or equal to 380 watt-hours per liter.

As an example, the energy storage apparatus includes 2-6 electric boxes, each electric box includes 10-100 battery cells, and each electric box includes 80 kilowatt-hours to 150 kilowatt-hours of electricity.

In the above technical solution, the rated energy of the energy storage apparatus is relatively small and the energy density of the energy storage apparatus is greater than or equal to 380 watt-hours per liter, meaning that the capacity and volume of the energy storage apparatus are both small. This saves space occupied by the energy storage apparatus and reduces a size of the charging apparatus. On the other hand, the maximum discharge power of the energy storage apparatus is relatively large, enabling the charging apparatus to provide supercharging capability without upgrading the power grid, thereby effectively reducing the construction cost of the charging apparatus.

In some embodiments, the charging power may be greater than or equal to 100 KW. For example, the charging power can be greater than or equal to 120 KW, 150 KW, 180 KW, 200 KW, 250 KW, 300 KW, 350 KW, 400 KW, and the like.

The charging demand power may be greater than or equal to 300 KW. For example, the charging demand power may be greater than or equal to 320 KW, 360 KW, 400 KW, 450 KW, 480 KW, 500 KW, 550 KW, 600 KW, and the like.

As a result, this further achieves the goal of low-power input and high-power output for charging the battery apparatus, thereby significantly improving the charging speed of the battery apparatus.

In some embodiments, the charging demand information may include charging mode information, where in a case that the charging mode information includes first charging mode information, the charging demand power includes first charging demand power; and in a case that the charging mode information includes second charging mode information, the charging demand power includes second charging demand power. The first charging demand power is greater than the second charging demand power.

The first charging mode information may be used to indicate a supercharging mode, and the second charging mode information may be used to indicate a fast charging mode.

Optionally, the first charging demand power may be greater than or equal to 300 KW. For example, the first charging demand power may be greater than or equal to 350 KW, 400 KW, 450 KW, 480 KW, 520 KW, 560 KW, 600 KW, 700 KW, 800 KW, and the like.

For example, the second charging demand power may be in a range of 150 KW to 300 KW. For example, the second charging demand power may be in a range of 180 KW to 280 KW, or in a range of 200 KW to 260 KW, or in a range of 220 KW to 240 KW.

Furthermore, the charging mode information may further include third charging mode information. In a case that the charging mode information includes third charging mode information, the charging demand power includes third charging demand power, and the third charging demand power is less than the second charging demand power.

The third charging mode information may be used to indicate a slow charging mode.

Exemplarily, the third charging demand power may be less than 150 KW. For example, the third charging demand power may be less than 5 KW, 7 KW, 10 KW, 30 KW, 50 KW, 70 KW, 90 KW, 110 KW, and the like.

The above technical solution provides multiple charging modes, and the multiple charging modes correspond to different charging demand powers. In this way, in an actual charging process, the charging apparatus can flexibly use an appropriate charging method based on actual conditions to charge the battery apparatus, thereby effectively improving charging efficiency.

In some embodiments, in a case that the charging mode information includes the first charging mode information, the discharge power of the energy storage apparatus includes first discharge power; and in a case that the charging mode information includes the second charging mode information, the discharge power of the energy storage apparatus includes second discharge power. The first discharge power is greater than or equal to the second discharge power.

Optionally, the first discharge power may be less than the first charging demand power, and the second discharge power may be less than the second charging demand power.

The first discharge power may be greater than or equal to 300 KW. For example, the first discharge power may be greater than or equal to 350 KW, 400 KW, 450 KW, 480 KW, 520 KW, 560 KW, 600 KW, 700 KW, 800 KW, and the like.

For example, the second discharge power may be in a range of 150 KW to 300 KW. For example, the second discharge power may be in a range of 180 KW to 280 KW, or in a range of 200 KW to 260 KW, or in a range of 220 KW to 240 KW.

In a case that the charging mode information includes third charging mode information, the charging demand power may include third discharge power, and the third discharge power is less than the second discharge power.

The third discharge power may be less than the third charging demand power. Exemplarily, the third discharge power may be less than 150 KW. For example, the third discharge power may be less than 5 KW, 7 KW, 10 KW, 30 KW, 50 KW, 70 KW, 90 KW, 110 KW, and the like.

The above technical solution provides multiple charging modes, and the multiple charging modes correspond to different discharge powers. In this way, in an actual charging process, the charging apparatus can flexibly use an appropriate charging method based on actual conditions to charge the battery apparatus, thereby effectively improving charging efficiency.

In some embodiments, in a case that the charging mode information includes the first charging mode information, a discharge rate of the energy storage apparatus includes a first discharge rate; and in a case that the charging mode information includes the second charging mode information, the discharge rate of the energy storage apparatus includes a second discharge rate. The first discharge rate is greater than the second discharge rate.

Optionally, the first discharge rate may be greater than or equal to 2 times the rate. For example, the first discharge rate may be greater than or equal to 3 times the rate, 3.5 times the rate, 4 times the rate, 4.5 times the rate, 5 times the rate, 6 times the rate, 7 times the rate, 8 times the rate, 10 times the rate, and the like.

The second discharge rate may be greater than or equal to 1 time the rate. For example, the second discharge rate may be greater than or equal to 2 times the rate, 2.5 times the rate, 3 times the rate, 3.5 times the rate, 4 times the rate, 4.5 times the rate, 5 times the rate, 5.5 times the rate, 6 times the rate, 7 times the rate, 8 times the rate, and the like.

Those skilled in the art can understand that the first discharge rate and the second discharge rate may be the values in the aforementioned examples, and they only need to meet the requirement that the first discharge rate is greater than the second discharge rate, for example, the first discharge rate is 4 times the rate, and the second discharge rate is 2 times the rate.

In a case that the charging mode information includes the third charging mode information, the discharge rate of the energy storage apparatus may include a third discharge rate, and the third discharge rate is less than the second discharge rate.

The above technical solution provides multiple charging modes, and the multiple charging modes correspond to different discharge rates. In this way, in an actual charging process, the charging apparatus can flexibly use an appropriate charging method based on actual conditions to charge the battery apparatus, thereby effectively improving charging efficiency.

In some embodiments, in a case that the charging mode information includes the first charging mode information, the charging power includes first charging power; and in a case that the charging mode information includes the second charging mode information, the charging power includes second charging power; where The first charging power is greater than or equal to the second charging power.

Optionally, the first charging power may be greater than or equal to 300 KW. For example, the first charging power may be greater than or equal to 350 KW, 400 KW, 450 KW, 480 KW, 520 KW, 560 KW, 600 KW, 700 KW, 800 KW, and the like.

For example, the second charging power may be in a range of 150 KW to 300 KW. For example, the second charging power may be in a range of 180 KW to 280 KW, or in a range of 200 KW to 260 KW, or in a range of 220 KW to 240 KW.

In a case that the charging mode information includes third charging mode information, the charging power includes third charging power, and the third charging power is less than the second charging power.

Exemplarily, the third charging power may be less than 150 KW. For example, the third charging power may be less than 5 KW, 7 KW, 10 KW, 30 KW, 50 KW, 70 KW, 90 KW, 110 KW, and the like.

The above technical solution provides multiple charging modes, and the multiple charging modes correspond to different charging powers. In this way, in an actual charging process, the charging apparatus can flexibly use an appropriate charging method based on actual conditions to charge the battery apparatus, thereby effectively improving charging efficiency.

In a case that the charging demand information includes charging mode information, as an example, S210 may specifically include: randomly selects a piece of charging mode information from multiple pieces of charging mode information to charge the battery apparatus.

As another example, S210 may specifically include: obtain historical charging mode information of the battery apparatus, and determine the current charging mode information for charging the battery apparatus according to the historical charging mode information.

For example, the charging mode information used to charge the battery apparatus last time can be determined as the charging mode information for charging the battery apparatus this time.

Furthermore, the most frequently used charging mode information can be determined according to the historical charging mode information, and the most frequently used charging mode information can be determined as the charging mode information for charging the battery apparatus this time.

As yet another example, S210 can specifically include: receive the charging mode information.

For example, the battery apparatus can determine the charging mode for charging this time according to its own battery status parameters. Then, it sends the charging mode information to the charging apparatus, where the charging mode information indicates the determined charging mode.

For example, the charging mode information input by a user can be received, and at this time, the charging mode information is used to indicate the charging mode selected by the user for charging the battery apparatus.

Optionally, the user may input the charging mode information on the charging apparatus. Alternatively, the user may input the charging mode information on the battery apparatus, so that the battery apparatus sends the charging mode information to the charging apparatus.

The user can first determine the charging mode for charging the battery apparatus this time, and then send the charging mode information to the charging apparatus.

The user can determine the charging mode based on multiple factors. For example, the user can determine the charging mode based on factors such as the remaining power of the battery apparatus, charging cost, distance to the target location, time available for charging, personal habits of the user, or environment of the user. Specifically, if it is nighttime and the user needs to use the battery apparatus the next morning, the user can select slow charging from multiple charging modes. Alternatively, if the user is on the highway and the remaining power of the battery apparatus is low, the user can select supercharging from multiple charging modes to fully charge the battery apparatus or charge it to a sufficient amount for reaching the destination in a short time. Furthermore, if the user prefers fast charging from multiple charging modes, the user can select fast charging from multiple charging modes.

In the above technical solution, the charging mode information of the battery apparatus is obtained by receiving the charging mode information input by the user. The charging mode information acquired in this way is associated with the related situation of the user at the current moment. For example, if the user does not have much time to wait for the charging apparatus to charge the battery apparatus, the user can select a charging mode with higher power, thereby effectively improving the user experience.

In some cases, the charging mode received by the charging apparatus may not be suitable for the battery apparatus or the charging apparatus cannot support the charging mode. Therefore, the method 200 may further include: determine whether the charging mode matches the charging apparatus, and/or determine whether the charging mode matches the battery apparatus, and in a case of a mismatch, send switching information, where the switching information is used to indicate switching of the charging mode. At this time, S230 may specifically include: determine the charging parameter of the charging apparatus according to the discharge capacity information and the switched charging mode.

For example, if the user selects the supercharging mode, but the charging apparatus cannot provide supercharging to the battery apparatus, the charging apparatus can send switching information indicating the switching of the charging mode. For example, text or voice indicating the switching from supercharging to fast charging or slow charging can be displayed on the display interface.

Furthermore, if the user selects the supercharging mode, but the charging apparatus determines that the battery apparatus cannot support supercharging based on some parameters of the battery apparatus, the charging apparatus can send switching information indicating the switching from supercharging to another charging mode.

In the above technical solution, upon the reception of the charging mode, it is determined whether the charging mode matches the charging apparatus and/or whether the charging mode matches the battery apparatus. If there is a mismatch, switching information indicating switching of the charging mode is sent, ensuring that the final determined charging mode better matches both the charging apparatus and the battery apparatus. This results in better charging performance for the battery apparatus and improves the user experience.

In addition to the charging mode information, the charging demand information may further include charging amount information, and the charging amount information may include one or more of the following information: a charging duration, a charging amount, a target amount of the battery apparatus, and a charging cost.

At this time, the method 200 may further include: stopping charging of the battery apparatus when a charging operation matches the charging amount information.

For example, the charging amount information includes the charging duration, and the charging duration is 2 hours. When the charging apparatus charges the battery apparatus for 2 hours, the charging apparatus stops charging the battery apparatus.

Furthermore, the charging amount information includes the target amount of the battery apparatus, and the target amount is full charge. When the charging apparatus charges the battery apparatus to full charge, the charging apparatus stops charging the battery apparatus.

In the above technical solution, the charging demand information includes one or more of the following: the charging duration, the charging amount, the target amount of the battery apparatus, and the charging cost. This means that the charging demand information may include various parameters related to charging. As a result, the accuracy of the charging parameter determined based on the charging demand information is relatively high, leading to high efficiency in charging the battery apparatus based on the parameter.

Of course, the charging apparatus can also stop charging the battery apparatus in the following situations: charging apparatus failure, battery apparatus failure, single cell charging cut-off voltage limit crossing, single cell temperature limit crossing, charging current limit crossing, and the like.

In addition to the energy storage apparatus, the charging apparatus may further include an electrical power conversion apparatus, and the electrical power conversion apparatus is configured to charge the energy storage apparatus through input electrical power.

The electrical power conversion apparatus, for example, may include the alternating current/direct current (alternating current/direct current, AC/DC) converter in FIG. 1. Alternatively, the electrical power conversion apparatus may include, for example, an AC/DC converter and a direct current/direct current (direct current/direct current, DC/DC) converter.

The electrical power conversion apparatus may include rated power. In some embodiments, the rated power may meet at least one of the following: the charging demand power is greater than the rated power, the charging power is greater than the rated power, and the discharge power of the energy storage apparatus is greater than the rated power.

The rated power may be in a range of 30 KW to 150 KW. For example, the rated power may be 50 KW, 70 KW, 80 KW, 100 KW, 110 KW, 130 KW, and the like. The charging apparatus provided in embodiments of this disclosure may be installed or configured in a working environment with limited power supply, for example, the working environment of the charging apparatus can only provide a small input power. If a larger input power is required, the working environment needs to be modified, for example, the capacity of the transformer needs to be expanded, which has a high construction cost. However, in the technical solution provided by embodiments of this disclosure, although the input power is small, for example, the rated input power of the electrical power conversion apparatus includes 30 KW-150 KW, high power output for charging the battery apparatus can still be provided, thereby significantly improving the charging speed of the battery apparatus.

Optionally, the charging demand power may be greater than x times the rated power, and/or the charging power may be greater than x times the rated power, and/or the discharge power of the energy storage apparatus may be greater than x times the rated power.

Exemplarily, x may be 1.5, 2, 3, 4, 5, 6, or larger.

In the above technical solution, the charging demand power is greater than x times the rated power, and/or the charging power is greater than x times the rated power, and/or the discharge power is greater than x times the rated power, for example, x equals 3. This enables the charging apparatus to achieve a significantly high power output from a relatively small power input, thereby greatly improving the charging speed of the battery apparatus.

In some embodiments, the charging power may include the discharge power of the energy storage apparatus. In other words, part or all of the charging power is derived from the discharge power of the energy storage apparatus.

Figure 3:
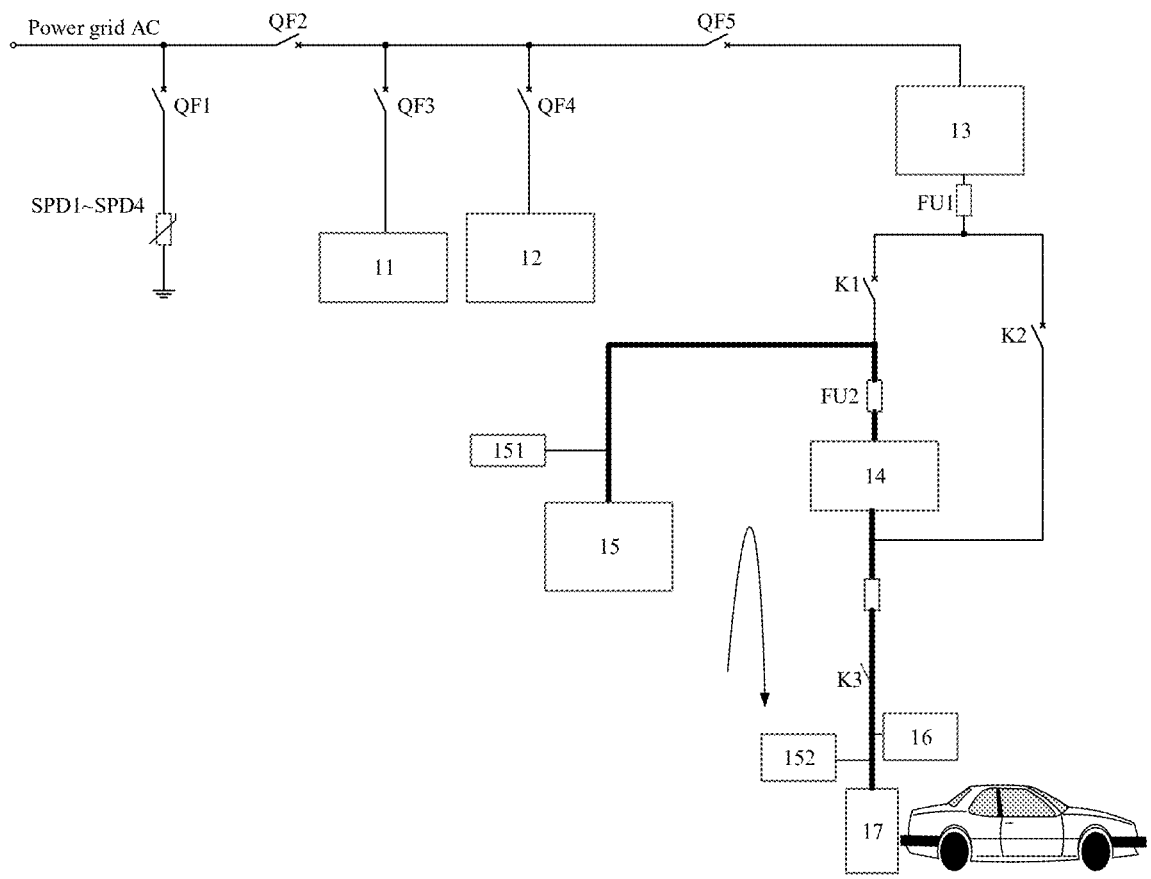
FIG. 3 is a schematic diagram of an energy storage apparatus independently charging a battery apparatus according to an embodiment of this application.
Figure 4:
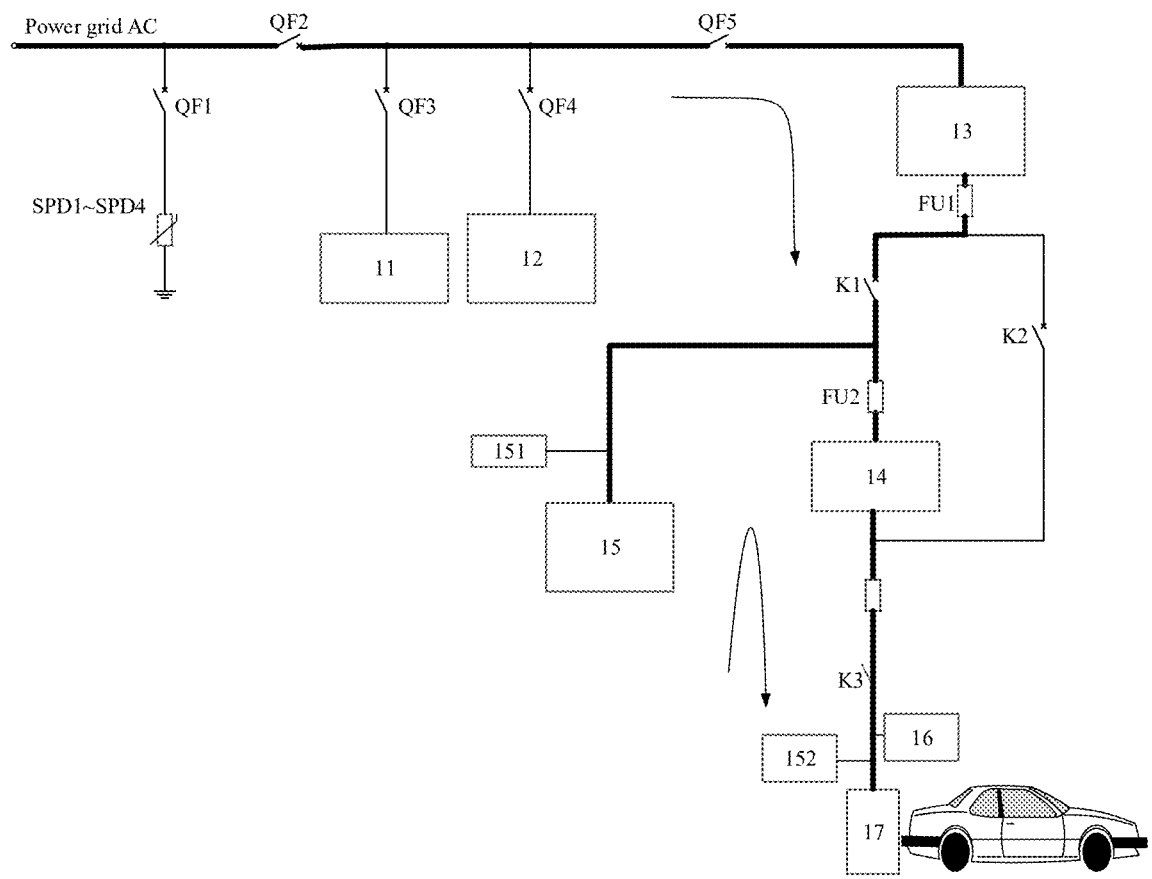
FIG. 4 is a schematic diagram of an energy storage apparatus and an electrical power conversion apparatus jointly charging a battery apparatus according to an embodiment of this application.

When all of the charging power is derived from the discharge power of the energy storage apparatus, as shown in FIG. 3, the energy storage apparatus can independently charge the battery apparatus. When part of the charging power is derived from the energy storage apparatus, as shown in FIG. 4, the energy storage apparatus can jointly charge the battery apparatus with other apparatuses such as the electrical power conversion apparatus.

Figure 5:
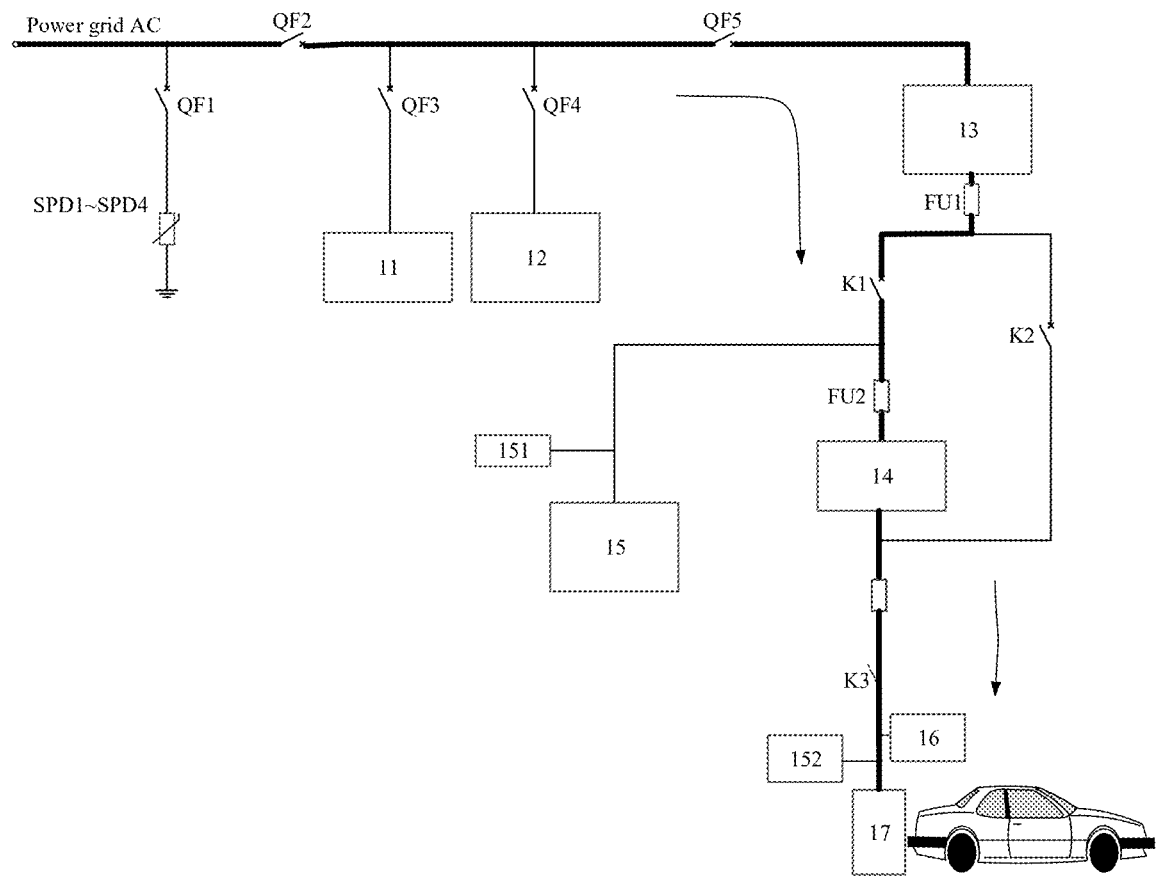
FIG. 5 is a schematic diagram of an electrical power conversion apparatus independently charging a battery apparatus according to an embodiment of this application.

Of course, the charging power may all be derived from the discharge power of the electrical power conversion apparatus. At this time, as shown in FIG. 5, the electrical power conversion apparatus independently charges the battery apparatus.

In the above technical solution, the charging power includes the discharge power of the energy storage apparatus, meaning that part or all of the charging power is derived from the discharge power of the energy storage apparatus. In other words, there are multiple ways for the charging apparatus to charge the battery apparatus, such as the energy storage apparatus charging the battery apparatus independently, or the energy storage apparatus and other components jointly charging the battery apparatus. In this way, the charging apparatus can flexibly use an appropriate charging method based on actual conditions to charge the battery apparatus, thereby effectively improving charging efficiency.

In a case that the discharge capacity information meets a first preset condition, charging the battery apparatus may include: charging the battery apparatus independently through the energy storage apparatus. In a case that the discharge capacity information meets a second preset condition, charging the battery apparatus includes: charging the battery apparatus through the energy storage apparatus and the electrical power conversion apparatus. In a case that the discharge capacity information meets a third preset condition, charging the battery apparatus includes: charging the battery apparatus through the electrical power conversion apparatus.

In the above technical solution, when the discharge capacity information meets different preset conditions, the charging apparatus charges the battery apparatus through different apparatuses. In other words, the charging apparatus can flexibly use an appropriate charging method based on actual conditions to charge the battery apparatus, thereby effectively improving charging efficiency.

The discharge capacity information may include but is not limited to the SOC of the energy storage apparatus, the state of energy (state of energy, SOE) of the energy storage apparatus, and the like.

In a case that the discharge capacity information includes an SOC of the energy storage apparatus, the discharge capacity information meeting the first preset condition may include: the SOC belonging to a first SOC range; and/or the discharge capacity information meeting the second preset condition may include: the SOC belonging to a second SOC range; and/or the discharge capacity information meeting the third preset condition includes: the SOC belonging to a third SOC range.

The first SOC range may be greater than or equal to 50% SOC. For example, the first SOC range may be greater than or equal to 60% SOC, or greater than or equal to 70% SOC, or greater than or equal to 80% SOC, or greater than or equal to 90% SOC, or greater than or equal to 95% SOC.

The second SOC range may be greater than or equal to 20% SOC and less than 50% SOC. For example, the second SOC range may be greater than or equal to 25% SOC and less than or equal to 45% SOC, or greater than or equal to 30% SOC and less than or equal to 40% SOC.

The third SOC range may be less than 20% SOC. For example, the third SOC range may be less than 15% SOC, or less than 10% SOC, or less than 5% SOC.

A component within the charging apparatus that charges the battery apparatus is determined based on the state of charge of the energy storage apparatus. This ensures that the determined power supply source aligns with the actual condition of the energy storage apparatus, allowing the charging apparatus to complete the charging of the battery apparatus in a reasonable and efficient manner.

In a case that the discharge capacity information includes an SOE of the energy storage apparatus, the discharge capacity information meeting the first preset condition may include: the SOE belonging to a first SOE range; and/or the discharge capacity information meeting the second preset condition may include: the SOE belonging to a second SOE range; and/or the discharge capacity information meeting the third preset condition includes: the SOE belonging to a third SOE range.

The first SOE range may be greater than or equal to 50% SOE. For example, the first SOE range may be greater than or equal to 60% SOE, or greater than or equal to 70% SOE, or greater than or equal to 80% SOE, or greater than or equal to 90% SOE, or greater than or equal to 95% SOE.

The second SOE range may be greater than or equal to 20% SOE and less than 50% SOE. For example, the second SOE range may be greater than or equal to 25% SOE and less than or equal to 45% SOE, or greater than or equal to 30% SOE and less than or equal to 40% SOE.

The third SOE range may be less than 20% SOE. For example, the third SOE range may be less than 15% SOE, or less than 10% SOE, or less than 5% SOE.

A component within the charging apparatus that charges the battery apparatus is determined based on the energy state of the energy storage apparatus. This ensures that the determined power supply source aligns with the actual condition of the energy storage apparatus, allowing the charging apparatus to complete the charging of the battery apparatus in a reasonable and efficient manner.

Furthermore, the discharge capacity information can further indicate the maximum discharge power of the energy storage apparatus. At this time, the discharge capacity information meeting the first preset condition may include: the maximum discharge power belonging to a first power range; and/or the discharge capacity information meeting the second preset condition may include: the maximum discharge power belonging to a second power range; and/or the discharge capacity information meeting the third preset condition may include: the maximum discharge power belonging to a third power range.

The first power range may be greater than or equal to 300 KW. For example, the first power range may be greater than or equal to 350 KW, or greater than or equal to 400 KW, or greater than or equal to 450 KW, or greater than or equal to 500 KW, or greater than or equal to 550 KW, or greater than or equal to 600 KW, or greater than or equal to 700 KW, or greater than or equal to 800 KW, or the like.

For example, the second power range may be in a range of 150 KW to 300 KW. For example, the second power range may be in a range of 180 KW to 280 KW, or the second power range may be in a range of 200 KW to 250 KW.

For example, the third power range may be less than 150 KW. For example, the third power range may be less than or equal to 100 KW, or the third power range may be less than or equal to 80 KW, or the third power range may be less than or equal to 50 KW, or the third power range may be less than or equal to 30 KW, or the third power range may be less than or equal to 10 KW, or the third power range may be less than or equal to 7 KW.

In the above technical solution, a component within the charging apparatus that charges the battery apparatus is determined based on the maximum discharge power of the energy storage apparatus. This ensures that the determined power supply source aligns with the actual condition of the energy storage apparatus, allowing the charging apparatus to complete the charging of the battery apparatus in a reasonable and efficient manner.

In some embodiments, S220 may specifically include: determine the discharge capacity information of the energy storage apparatus according to an electrical parameter of the energy storage apparatus. The discharge capacity information indicates the maximum discharge power of the energy storage apparatus.

The electrical parameter may include but is not limited to the SOC of the energy storage apparatus, the SOE of the energy storage apparatus, the state of health (state of health, SOH) of the energy storage apparatus, and the like.

The maximum discharge power can be used to determine the actual output power of the energy storage apparatus.

In the above technical solution, the maximum discharge power of the energy storage apparatus is determined based on the electrical parameter of the energy storage apparatus. Subsequently, the charging parameter for charging the battery apparatus is determined based on the maximum discharge power of the energy storage apparatus. This ensures that the determined charging parameter aligns with the actual condition of the energy storage apparatus, allowing the charging apparatus to charge the battery apparatus in a reasonable and efficient manner.

In a case that the electrical parameter meets a fourth preset condition, the maximum discharge power includes a first maximum discharge power; in a case that the electrical parameter meets a fifth preset condition, the maximum discharge power includes a second maximum discharge power; and in a case that the electrical parameter meets a sixth preset condition, the maximum discharge power includes a third maximum discharge power. The maximum discharge power increases in the following sequence: the third maximum discharge power, the first maximum discharge power, and the second maximum discharge power.

In a case that the electrical parameter includes the SOC of the energy storage apparatus, the electrical parameter meeting the fourth preset condition may include: the SOC meeting a fourth SOC state range; and/or the electrical parameter meeting the fifth preset condition may include: the SOC meets a fifth SOC state range; and/or the electrical parameter meeting the sixth preset condition may include: the SOC meets a sixth SOC state range.

The fourth SOC range may be greater than or equal to 50% SOC. For example, the fourth SOC range may be greater than or equal to 60% SOC, or greater than or equal to 70% SOC, or greater than or equal to 80% SOC, or greater than or equal to 90% SOC, or greater than or equal to 95% SOC.

The fifth SOC range may be greater than or equal to 20% SOC and less than 50% SOC. For example, the fifth SOC range may be greater than or equal to 25% SOC and less than or equal to 45% SOC, or greater than or equal to 30% SOC and less than or equal to 40% SOC.

The sixth SOC range may be less than 20% SOC. For example, the sixth SOC range may be less than 15% SOC, or less than 10% SOC, or less than 5% SOC.

In the above technical solution, the maximum discharge power of the energy storage apparatus is determined based on the state of charge of the energy storage apparatus. Subsequently, the charging parameter for charging the battery apparatus is determined based on the maximum discharge power of the energy storage apparatus. This ensures that the determined charging parameter aligns with the current state of the energy storage apparatus, allowing the charging apparatus to charge the battery apparatus in a reasonable and efficient manner.

In a case that the electrical parameter includes the SOE of the energy storage apparatus, the electrical parameter meeting the fourth preset condition includes: the SOE belonging to a fourth SOE range; and/or the electrical parameter meeting the fifth preset condition includes: the SOE belonging to a fifth SOE range; and/or the electrical parameter meeting the sixth preset condition includes: the SOE belonging to a sixth SOE range.

The fourth SOE range may be greater than or equal to 50% SOE. For example, the fourth SOE range may be greater than or equal to 60% SOE, or greater than or equal to 70% SOE, or greater than or equal to 80% SOE, or greater than or equal to 90% SOE, or greater than or equal to 95% SOE.

The fifth SOE range may be greater than or equal to 20% SOE and less than 50% SOE. For example, the fifth SOE range may be greater than or equal to 25% SOE and less than or equal to 45% SOE, or greater than or equal to 30% SOE and less than or equal to 40% SOE.

The sixth SOE range may be less than 20% SOE. For example, the sixth SOE range may be less than 15% SOE, or less than 10% SOE, or less than 5% SOE.

In the above technical solution, the maximum discharge power of the energy storage apparatus is determined based on the energy state of the energy storage apparatus. Subsequently, the charging parameter for charging the battery apparatus is determined based on the maximum discharge power of the energy storage apparatus. This ensures that the determined charging parameter aligns with the current state of the energy storage apparatus, allowing the charging apparatus to charge the battery apparatus in a reasonable and efficient manner.

It should be understood that, in embodiments of this application, sequence numbers of the foregoing processes do not mean execution sequences. The execution sequences of the processes should be determined according to functions and internal logic of the processes, and should not be construed as any limitation on the implementation processes of embodiments of this application.

Moreover, provided there is no conflict, the various embodiments described in this application and/or the technical features within the respective embodiments can be combined arbitrarily. The technical solutions obtained through such combinations should also fall within the scope of protection of this application.

The charging method in embodiments of this application has been described in detail above. The charging apparatus of the embodiments of this application will be described below. It should be understood that the charging apparatus in embodiments of this application can execute the charging method in embodiments of this application.

Figure 6:
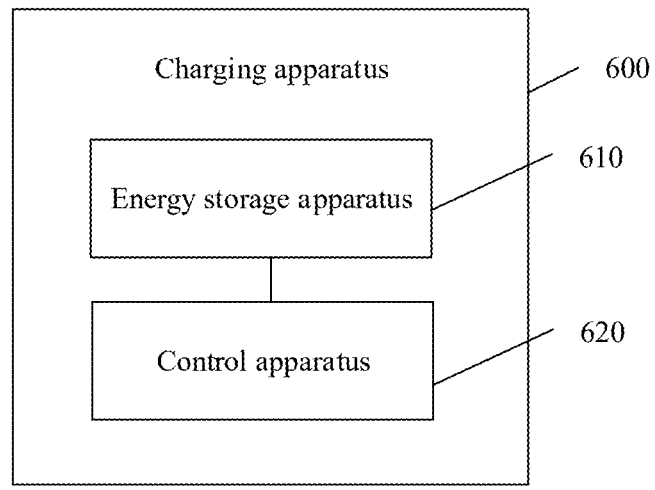
FIG. 6 is a schematic block diagram of a charging apparatus according to an embodiment of this application.

FIG. 6 is a schematic block diagram of a charging apparatus 600 according to an embodiment of this application. As shown in FIG. 6, the charging apparatus 600 includes an energy storage apparatus 610 and a control apparatus 620, and the charging apparatus 600 is configured to charge a battery apparatus through the energy storage apparatus 610. The control apparatus 620 may be configured to:

determine charging demand information of the battery apparatus, where the charging demand information is used to indicate charging demand power of the battery apparatus;

determine discharge capacity information of the energy storage apparatus;

determine a charging parameter of the charging apparatus according to the discharge capacity information and the charging demand information; and charge the battery apparatus according to the charging parameter, where charging power corresponding to the charging parameter is less than or equal to the charging demand power.

Optionally, in embodiments of this application, the charging power includes discharge power of the energy storage apparatus.

Optionally, in embodiments of this application, a ratio of rated energy to rated power of the energy storage apparatus is less than or equal to 1:3; and/or a ratio of the rated energy to maximum discharge power of the energy storage apparatus is less than or equal to 1:4, and/or an energy density of the energy storage apparatus is greater than or equal to 380 watt-hours per liter.

Optionally, in embodiments of this application, the charging demand information includes charging mode information, where in a case that the charging mode information includes first charging mode information, the charging demand power includes first charging demand power; and in a case that the charging mode information includes second charging mode information, the charging demand power includes second charging demand power; where the first charging demand power is greater than the second charging demand power.

Optionally, in embodiments of this application, in a case that the charging mode information includes the first charging mode information, the discharge power of the energy storage apparatus includes first discharge power; and in a case that the charging mode information includes the second charging mode information, the discharge power of the energy storage apparatus includes second discharge power; where the first discharge power is greater than or equal to the second discharge power.

Optionally, in embodiments of this application, in a case that the charging mode information includes the first charging mode information, a discharge rate of the energy storage apparatus includes a first discharge rate; and in a case that the charging mode information includes the second charging mode information, the discharge rate of the energy storage apparatus includes a second discharge rate; where the first discharge rate is greater than the second discharge rate.

Optionally, in embodiments of this application, in a case that the charging mode information includes the first charging mode information, the charging power includes first charging power; and in a case that the charging mode information includes the second charging mode information, the charging power includes second charging power; where the first charging power is greater than the second charging power.

Optionally, in embodiments of this application, the control apparatus 620 is specifically configured to: receive the charging mode information input by a user, where the charging mode information is used to indicate a charging mode selected by the user for charging the battery apparatus.

Optionally, in embodiments of this application, the control apparatus 620 is further configured to: determine whether the charging mode matches the charging apparatus, and/or whether the charging mode matches the battery apparatus; send switching information in a case that the charging mode does not match the charging apparatus and/or the charging mode does not match the battery apparatus, where the switching information is used to indicate switching of the charging mode; and determine the charging parameter according to the discharge capacity information and the switched charging mode.

Optionally, in embodiments of this application, the charging demand information includes charging amount information, and the charging amount information includes one or more of the following information: a charging duration, a charging amount, a target amount of the battery apparatus, and a charging cost; and the control apparatus 620 is further configured to: stop charging of the battery apparatus when a charging operation matches the charging amount information.

Optionally, in embodiments of this application, the charging apparatus further includes an electrical power conversion apparatus, where the electrical power conversion apparatus is configured to charge the energy storage apparatus through input electrical power, the electrical power conversion apparatus includes rated power, the charging demand power is greater than the rated power, the charging power is greater than the rated power, and/or the discharge power of the energy storage apparatus is greater than the rated power.

Optionally, in embodiments of this application, the charging demand power is greater than 3 times the rated power; and/or the charging power is greater than 3 times the rated power; and/or the discharge power of the energy storage apparatus is greater than 3 times the rated power.

Optionally, in embodiments of this application, in a case that the discharge capacity information meets a first preset condition, the control apparatus is further configured to: charge the battery apparatus independently through the energy storage apparatus; in a case that the discharge capacity information meets a second preset condition, the control apparatus is further configured to: charge the battery apparatus through the energy storage apparatus and the electrical power conversion apparatus; and in a case that the discharge capacity information meets a third preset condition, the control apparatus is further configured to: charge the battery apparatus independently through the electrical power conversion apparatus.

Optionally, in embodiments of this application, the discharge capacity information includes a state of charge of the energy storage apparatus; where the discharge capacity information meeting the first preset condition includes: the state of charge belonging to a first state of charge range; and/or the discharge capacity information meeting the second preset condition includes: the state of charge belonging to a second state of charge range; and/or the discharge capacity information meeting the third preset condition includes: the state of charge belonging to a third state of charge range.

Optionally, in embodiments of this application, the discharge capacity information includes an energy state of the energy storage apparatus; where the discharge capacity information meeting the first preset condition includes: the energy state belonging to a first energy state range; and/or the discharge capacity information meeting the second preset condition includes: the energy state belonging to a second energy state range; and/or the discharge capacity information meeting the third preset condition includes: the energy state belonging to a third energy state range.

Optionally, in embodiments of this application, the discharge capacity information indicates the maximum discharge power of the energy storage apparatus. The discharge capacity information meeting the first preset condition includes: the maximum discharge power belonging to a first power range; and/or the discharge capacity information meeting the second preset condition includes: the maximum discharge power belonging to a second power range; and/or the discharge capacity information meeting the third preset condition includes: the maximum discharge power belonging to a third power range.

Optionally, in embodiments of this application, the control apparatus 620 is specifically configured to: determine the discharge capacity information of the energy storage apparatus according to an electrical parameter of the energy storage apparatus, where the discharge capacity information indicates the maximum discharge power of the energy storage apparatus.

Optionally, in embodiments of this application, in a case that the electrical parameter meets a fourth preset condition, the maximum discharge power includes a first maximum discharge power; in a case that the electrical parameter meets a fifth preset condition, the maximum discharge power includes a second maximum discharge power; and in a case that the electrical parameter meets a sixth preset condition, the maximum discharge power includes a third maximum discharge power; where the maximum discharge power increases in the following sequence: the third maximum discharge power, the first maximum discharge power, and the second maximum discharge power.

Optionally, in embodiments of this application, the electrical parameter includes the state of charge of the energy storage apparatus; where the electrical parameter meeting the fourth preset condition includes: the state of charge belonging to a fourth state of charge range; and/or the electrical parameter meeting the fifth preset condition includes: the state of charge belonging to a fifth state of charge range; and/or the electrical parameter meeting the sixth preset condition includes: the state of charge belonging to a sixth state of charge range.

Optionally, in embodiments of this application, the electrical parameter includes the energy state of the energy storage apparatus; where the electrical parameter meeting the fourth preset condition includes: the energy state belonging to a fourth energy state range; and/or the electrical parameter meeting the fifth preset condition includes: the energy state belonging to a fifth energy state range; and/or the electrical parameter meeting the sixth preset condition includes: the energy state belonging to the sixth state of charge range.

Optionally, in embodiments of this application, the charging power is greater than or equal to 100 KW, and/or the charging demand power is greater than or equal to 300 KW.

It should be understood that the charging apparatus 600 can achieve the corresponding operations in the charging method 200. For brevity, details are not described herein again.

Figure 7:
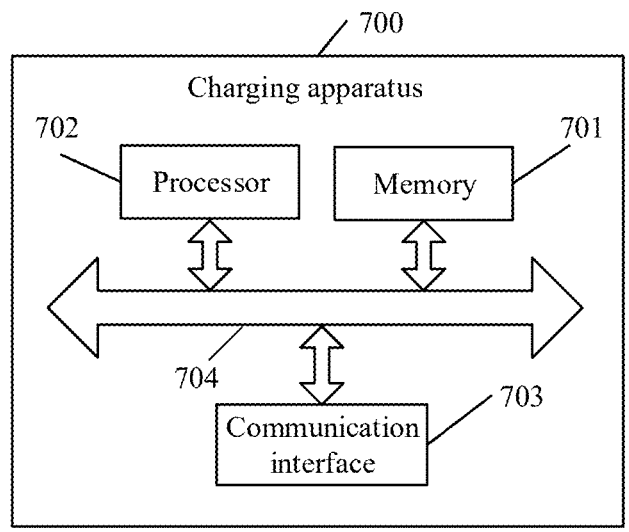
FIG. 7 is a schematic block diagram of another charging apparatus according to an embodiment of this application.

FIG. 7 is a schematic diagram of a hardware structure of a charging apparatus 700 according to an embodiment of this application. The charging apparatus 700 includes a memory 701, a processor 702, a communication interface 703, and a bus 707. The memory 701, the processor 702, and the communication interface 703 implement a communication connection to each other through the bus 707.

The memory 701 may be a read-only memory (read-only memory, ROM), a static storage device, and a random access memory (random access memory, RAM). The memory 701 can store a program. When the program stored in the memory 701 is executed by the processor 702, the processor 702 and the communication interface 703 are configured to execute the steps of the charging method according to embodiments of this application.

The processor 702 may be a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, so as to implement functions that need to be executed by the units in the apparatus according to embodiments of this application, or execute the charging method according to embodiments of this application.

The processor 702 may alternatively be an integrated circuit chip with a signal processing capability. During implementation, the steps of the charging method according to embodiments of this application may be completed by hardware integrated logic circuits in the processor 702 or instructions in the form of software.

The foregoing processor 702 may alternatively be a general-purpose processor, a digital signal processor (digital signal processing, DSP), an ASIC, a field programmable gate array (field programmable gate array, FPGA) or another programmable logic device, a discrete gate or transistor logic device, or a discrete hardware component. The methods, steps, and logical block diagrams disclosed in embodiments of this application can be implemented or executed. The general-purpose processor may be a microprocessor or any conventional processor. The steps of the method disclosed with reference to embodiments of this application may be directly implemented by a hardware processor, or may be implemented by a combination of hardware and a software module in a processor. The software module may be located in a storage medium mature in the art, such as a random access memory, a flash memory, a read-only memory, a programmable read-only memory or electrically erasable programmable memory, or a register. The storage medium is located in the memory 701. The processor 702 reads information from the memory 701, and in combination with hardware of the processor 702, performs functions that need to be performed by the units included in the charging apparatus 700 according to this embodiment of this application, or perform the charging method according to embodiments of this application.

The communication interface 703 uses transceiver apparatuses such as, but not limited to, transceivers to implement communication between the charging apparatus 700 and other devices or communication networks.

The bus 707 may include paths used for transmitting information between components of the charging apparatus 700 (for example, the memory 701, the processor 702, and the communication interface 703).

It should be noted that although in the foregoing charging apparatus 700, only the memory, the processor, and the communication interface are shown, during a specific implementation, persons skilled in the art should understand that the charging apparatus 700 may further include other components required for normal operation. In addition, based on specific requirements, persons skilled in the art should understand that the charging apparatus 700 may further include hardware components implementing other additional functions. Further, persons skilled in the art should understand that the charging apparatus 700 may alternatively include only components required for implementing embodiments of this application, but does not need to include all the components shown in FIG. 7.

An embodiment of this application further provides a readable storage medium, where the readable storage medium is configured to store a computer program, and the computer program is used to perform the method of all the foregoing embodiments of this application.

The foregoing computer-readable storage medium may be a transitory computer-readable storage medium or a non-transitory computer-readable storage medium.

An embodiment of this application further provides a computer program product, where the computer program product includes a computer program stored on a computer-readable storage medium, the computer program includes a program instruction, and when the program instruction is executed by a computer, the computer is caused to perform the foregoing charging method.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A charging method, characterized by being applied to a charging apparatus, wherein the charging apparatus comprises an energy storage apparatus, and the charging apparatus is configured to charge a battery apparatus through the energy storage apparatus, the method comprising:
   determining charging demand information of the battery apparatus, wherein the charging demand information is used to indicate charging demand power of the battery apparatus;
   determining discharge capacity information of the energy storage apparatus;
   determining a charging parameter of the charging apparatus according to the discharge capacity information and the charging demand information; and charging the battery apparatus according to the charging parameter, wherein charging power corresponding to the charging parameter is less than or equal to the charging demand power,
wherein a ratio of rated energy to rated power of the energy storage apparatus is less than or equal to 1:3; and
a ratio of the rated energy to maximum discharge power of the energy storage apparatus is less than or equal to 1:4; and
an energy density of the energy storage apparatus is greater than or equal to 380 watt-hours per liter.

2. The charging method according to claim 1, wherein the charging power comprises discharge power of the energy storage apparatus.

3. The charging method according to claim 1, wherein the charging demand information comprises charging mode information, wherein the charging mode information comprises first charging mode information, wherein the charging demand power comprises first charging demand power; and second charging mode information, wherein the charging demand power comprises second charging demand power; wherein
the first charging demand power is greater than the second charging demand power.

4. The charging method according to claim 3, wherein, in the first charging mode information, the discharge power of the energy storage apparatus comprises first discharge power; and in the second charging mode information, the discharge power of the energy storage apparatus comprises second discharge power; wherein
the first discharge power is greater than or equal to the second discharge power.

5. The charging method according to claim 3, wherein, in the first charging mode information, a discharge rate of the energy storage apparatus comprises a first discharge rate; and in the second charging mode information, the discharge rate of the energy storage apparatus comprises a second discharge rate; wherein
the first discharge rate is greater than the second discharge rate.

6. The charging method according to claim 3, wherein, in the first charging mode information, the charging power comprises first charging power; and in the second charging mode information, the charging power comprises second charging power; wherein
the first charging power is greater than the second charging power.

7. The charging method according to claim 3, wherein the determining charging demand information of the battery apparatus comprises:
receiving the charging mode information input by a user, wherein the charging mode information is used to indicate a charging mode selected by the user for charging the battery apparatus.

8. The charging method according to claim 7, wherein the method further comprises:
determining whether the charging mode matches the charging apparatus, and/or whether the charging mode matches the battery apparatus; and
sending switching information in a case that the charging mode does not match the charging apparatus and/or the charging mode does not match the battery apparatus, wherein the switching information is used to indicate switching of the charging mode; wherein the determining a charging parameter of the charging apparatus according to the discharge capacity information and the charging demand information comprises:
determining the charging parameter according to the discharge capacity information and the switched charging mode.

9. The charging method according to claim 1, wherein the charging apparatus further comprises an electrical power conversion apparatus, wherein the electrical power conversion apparatus is configured to charge the energy storage apparatus through input electrical power, and the electrical power conversion apparatus comprises a rated power; wherein
the charging demand power is greater than the rated power, the charging power is greater than the rated power, and/or the discharge power of the energy storage apparatus is greater than the rated power.

10. The charging method according to claim 9, wherein the charging demand power is greater than three times the rated power; and/or
the charging power is greater than three times the rated power; and/or
the discharge power of the energy storage apparatus is greater than three times the rated power.

11. The charging method according to claim 9, wherein, in a case that the discharge capacity information meets a first preset condition, the charging the battery apparatus comprises:
charging the battery apparatus independently through the energy storage apparatus;
in a case that the discharge capacity information meets a second preset condition, the charging the battery apparatus comprises:
charging the battery apparatus through the energy storage apparatus and the electrical power conversion apparatus; and
in a case that the discharge capacity information meets a third preset condition, the charging the battery apparatus comprises:
charging the battery apparatus independently through the electrical power conversion apparatus.

12. The charging method according to claim 1, wherein the determining discharge capacity information of the energy storage apparatus comprises:
determining the discharge capacity information of the energy storage apparatus according to an electrical parameter of the energy storage apparatus, wherein the discharge capacity information indicates the maximum discharge power of the energy storage apparatus.

13. The charging method according to claim 1, wherein the charging power is greater than or equal to 100 KW, and/or the charging demand power is greater than or equal to 300 KW.

14. A charging apparatus, characterized by comprising an energy storage apparatus and a control apparatus, wherein the charging apparatus is configured to charge a battery apparatus through the energy storage apparatus, and the control apparatus is configured to:
determine charging demand information of the battery apparatus, wherein the charging demand information is used to indicate charging demand power of the battery apparatus;
determine discharge capacity information of the energy storage apparatus;
determine a charging parameter of the charging apparatus according to the discharge capacity information and the charging demand information; and charge the battery apparatus according to the charging parameter, wherein charging power corresponding to the charging parameter is less than or equal to the charging demand power, wherein a ratio of rated energy to rated power of the energy storage apparatus is less than or equal to 1:3; and a ratio of the rated energy to maximum discharge power of the energy storage apparatus is less than or equal to 1:4; and an energy density of the energy storage apparatus is greater than or equal to 380 watt-hours per liter.

15. The charging apparatus according to claim 14, wherein the charging demand information comprises charging mode information; and the charging mode information comprises first charging mode information, wherein the charging demand power comprises first charging demand power; and second charging mode information, wherein the charging demand power comprises second charging demand power; wherein the first charging demand power is greater than the second charging demand power.

16. The charging apparatus according to claim 14, wherein the charging apparatus further comprises an electrical power conversion apparatus, wherein the electrical power conversion apparatus is configured to charge the energy storage apparatus through input electrical power, the electrical power conversion apparatus comprises rated power, the charging demand power is greater than the rated power, the charging power is greater than the rated power, and/or the discharge power of the energy storage apparatus is greater than the rated power.

17. The charging apparatus according to claim 14, wherein the control apparatus is specifically configured to:

determine the discharge capacity information of the energy storage apparatus according to an electrical parameter of the energy storage apparatus, wherein the discharge capacity information indicates the maximum discharge power of the energy storage apparatus.

18. A charging apparatus, comprising:

a memory for storing a program; and a processor for executing the program stored in the memory, and when the program stored in the memory is executed, the processor is configured to execute the charging method according to claim 1.

* * * * *